(12) United States Patent
Cathier et al.

(10) Patent No.: US 7,457,445 B2
(45) Date of Patent: Nov. 25, 2008

(54) USING CORNER PIXELS AS SEEDS FOR DETECTION OF CONVEX OBJECTS

(75) Inventors: Pascal Cathier, Exton, PA (US); Luca Bogoni, Philadelphia, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 634 days.

(21) Appl. No.: 11/062,415

(22) Filed: Feb. 22, 2005

(65) Prior Publication Data

US 2005/0190969 A1 Sep. 1, 2005

Related U.S. Application Data

(60) Provisional application No. 60/549,047, filed on Mar. 1, 2004.

(51) Int. Cl.
*G06K 9/00* (2006.01)
(52) U.S. Cl. .................. 382/128; 382/199; 378/21
(58) Field of Classification Search ............ 382/128, 382/129, 130, 131, 132, 133, 154, 162, 168, 382/172, 181, 199, 190–194, 203, 232, 237, 382/255, 260, 274, 276, 305, 286–289, 177, 382/134, 171; 600/425; 378/5, 21, 23
See application file for complete search history.

(56) References Cited

U.S. PATENT DOCUMENTS

| 6,556,696 B1 * | 4/2003 | Summers et al. ............ 382/128 |
| 6,947,784 B2 * | 9/2005 | Zalis ......................... 600/425 |
| 7,043,064 B2 * | 5/2006 | Paik et al. ................... 382/128 |
| 7,209,536 B2 * | 4/2007 | Walter et al. .................. 378/5 |
| 7,236,620 B1 * | 6/2007 | Gurcan ....................... 382/128 |
| 7,260,250 B2 * | 8/2007 | Summers et al. ............ 382/128 |

OTHER PUBLICATIONS

Yoshida H et al, "Three-Dimensional Computer-Aided Diagnosis Scheme for Detection of Colonic Polyps", *IEEE Transactions on Medical Imaging*, IEEE Inc., New York, US, vol. 20, No. 12, Dec. 2001, pp. 1261-1274.
Summers R M et al, "Automated Polyp Detector for CT Colonography: Feasibility Study", *Radiology*, Oak Brook, IL, US, vol. 216, No. 1, Jul. 2000, pp. 284-290.
Summers R M et al, "Polypoid Lesions of Airways: Early Experience with Computer-Assisted Detection by Using Virtual Bronchoscopy and Surface Curvature", *Radiology*, Oak Brook, IL, US, vol. 208, No. 2, Aug. 1998, pp. 31-37.
Pohle R et al, "Segmentation of Medical Images Using Adaptive Region Growing" *Proceedings of the SPIE—The International Society for Optical Engineering*, vol. 4322, 2001, pp. 1337-1346.
Paik D S et al, Method for Detecting Shapes in Medical Images, United States Patent Application Publication, Pub. No. US 2002/0164061 A1, Pub. Date Nov. 7, 2002.
Search Report (including Notification of Transmittal of the International Search Report, International Search Report, and Written Opinion of the International Searching Authority), (2005).

* cited by examiner

*Primary Examiner*—Seyed Azarian

(57) ABSTRACT

An exemplary for selecting seeds from an image for region determination is provided. The method includes determining a boundary between two areas in the image; selecting pixels on the boundary that are characterized by a salient feature that identifies the pixels as seeds for determining a region; and determining a second region from one of the selected pixels if the one of the selected pixels is not part of a previously determined first region.

19 Claims, 6 Drawing Sheets

Figure 3

|  $a_3$ | $a_4$ | $a_5$ |
|---|---|---|
| $a_2$ | $c$ | $a_6$ |
| $a_1$ | $a_8$ | $a_7$ |

USING CORNER PIXELS AS SEEDS FOR DETECTION OF CONVEX OBJECTS

CROSS-REFERENCE TO RELATED APPLICATIONS

This application claims priority to U.S. Provisional Application No. 60/549,047, which was filed on Feb. Mar. 1, 2004, and which is fully incorporated herein by reference.

BACKGROUND OF THE INVENTION

1. Field of the Invention

The present invention relates generally to the field of computer imaging, and, more particularly, to using salient features of an image to determine seeds for detecting objects.

2. Description of the Related Art

Detecting object shapes in a two-dimensional ("2D") and three-dimensional ("3D") image is essential in a number of applications, such as computer-aided detection and diagnosis. A computer-aided detection and diagnosis application, for example, typically uses shape localization as a preliminary step for identifying specific structures that may be of interest (e.g., potentially indicative of disease). The term "shape localization" refers to associating coordinates to a given position in a volume or space.

Shape localization may typically proceed in two steps:

(1) Identification and extraction of collections (i.e., regions) of pixels/voxels that collectively or individually characterize a shape; and (2) Evaluation and analysis of the collections using various shape descriptors/metrics to determine whether the collections adequately represent the shape in consideration.

Approaches for region determination include, but are not limited to, region growing, region clustering and region segmentation. Traditional region growing techniques, such as greedy region, may have very simple criteria to select seeds (i.e., starting points) for growing a region. For example, one exemplary region growing technique may consider every pixel/voxel in an image and verify whether the region extracted from a particular pixel/voxel possesses desired characteristics (e.g., compactness, ellipsoidal structure or others), which are representative of shape features associated with a desired shape. If the extracted region possesses the desired characteristics, then the extracted region can be considered an "instance" of the detected shape.

As used herein, the term "shape" refers to a space or volume surrounded by a boundary that separates the space or volume from adjacent material or structures. Such boundaries may have a sharp or a fuzzy transition (i.e., edge). A boundary is a special type of transition that has a definite extent in the direction perpendicular to the transition. The quality of the transition varies depending on the material and the imaging method used in acquiring the data. For one example, the edge may be binary (e.g., a direct transition from black to white or vice versa) if acquired with a laser-range scanner imaging a surface. For another example, the edge may be sharp with an intensity transition, such as in the case of computer tomographic ("CT") or x-ray images of materials (e.g., suitcases) or of persons undergoing routine physical examinations. For yet another example, the edge may not be well-defined locally as in the case of ultrasound or magnetic resonance imaging. However, irrespective of the above-described quality of a boundary, any point on the boundary that determines the separation of a desired structure from undesired, neighboring structures can be used as a seed to grow a region.

Referring now to FIG. 1, an exemplary computer tomography ("CT") image of a portion of a colon 100 is shown boundary 105 (i.e., white-ribbon area) which is a transition between two regions: the lumen 110 (i.e., the shaded area) and separating tissue 115 (i.e., the patterned area). The area enclosed by the dashed line 120 illustrates an example of a protrusion (i.e., convex region) that one may desire to detect. This convex region may also be referred to as a region of interest. In the context of the CT image of the colon 100, the area enclosed by the dashed line 120 may be, for example, a colonic polyp or a pulmonary nodule attached to the pleura.

Referring now to FIG. 2, another view of the CT image of the portion of the colon 100 of FIG. 1 is illustrated. FIG. 2 more clearly illustrates a convex region 205 and a virtual surface 210 that segments the convex region 205. The virtual surface 210 is a smooth continuation of the boundary 215 if the protrusion (i.e., the convex region 205) did not exist. It should be noted that the virtual surface 210 is shown in FIG. 2 only as a visual aid.

In a traditional greedy algorithm, all surface points on the boundary 105 may be considered as potential seeds. Such a process may be unduly time-consuming and inefficient, especially in large (e.g., on the order of several million pixels/voxels) images.

SUMMARY OF THE INVENTION

In one aspect of the present invention, a method for selecting seeds from an image for region determination is provided. The method includes determining a boundary between two areas in the image; selecting pixels on the boundary that are characterized by a salient feature that identifies the pixels as seeds for determining a region; and determining a second region from one of the selected pixels if the one of the selected pixels is not part of a previously determined first region.

In another aspect of the present invention, a machine-readable medium having instructions stored thereon for execution by a processor to perform a method for selecting seeds from an image for region determination is provided. The method includes determining a boundary between two areas in the image; selecting pixels on the boundary that are characterized by a salient feature that identifies the pixels as seeds for determining a region; and determining a second region from one of the selected pixels if the one of the selected pixels is not part of a previously determined first region.

In yet another aspect of the present invention, a method for selecting seeds from an image for region growing is provided. The method includes determining a boundary surface between two regions in the image; filtering pixels of the boundary surface that are corners in a lower dimension; placing the filtered pixels in a seed list; selecting a first seed from the seed list for growing a first region; and selecting a second seed from the seed list, wherein the second seed is for growing a second region only if the second seed is not part of the first region

BRIEF DESCRIPTION OF THE DRAWINGS

The invention may be understood by reference to the following description taken in conjunction with the accompanying drawings, in which like reference numerals identify like elements, and in which:

FIG. 3 depicts a neighborhood in 2D is shown with C at the center and neighbors a1-a8 at distance 1 from C, in accordance with one exemplary embodiment of the present invention;

DETAILED DESCRIPTION OF PREFERRED EMBODIMENTS

Figure 1:
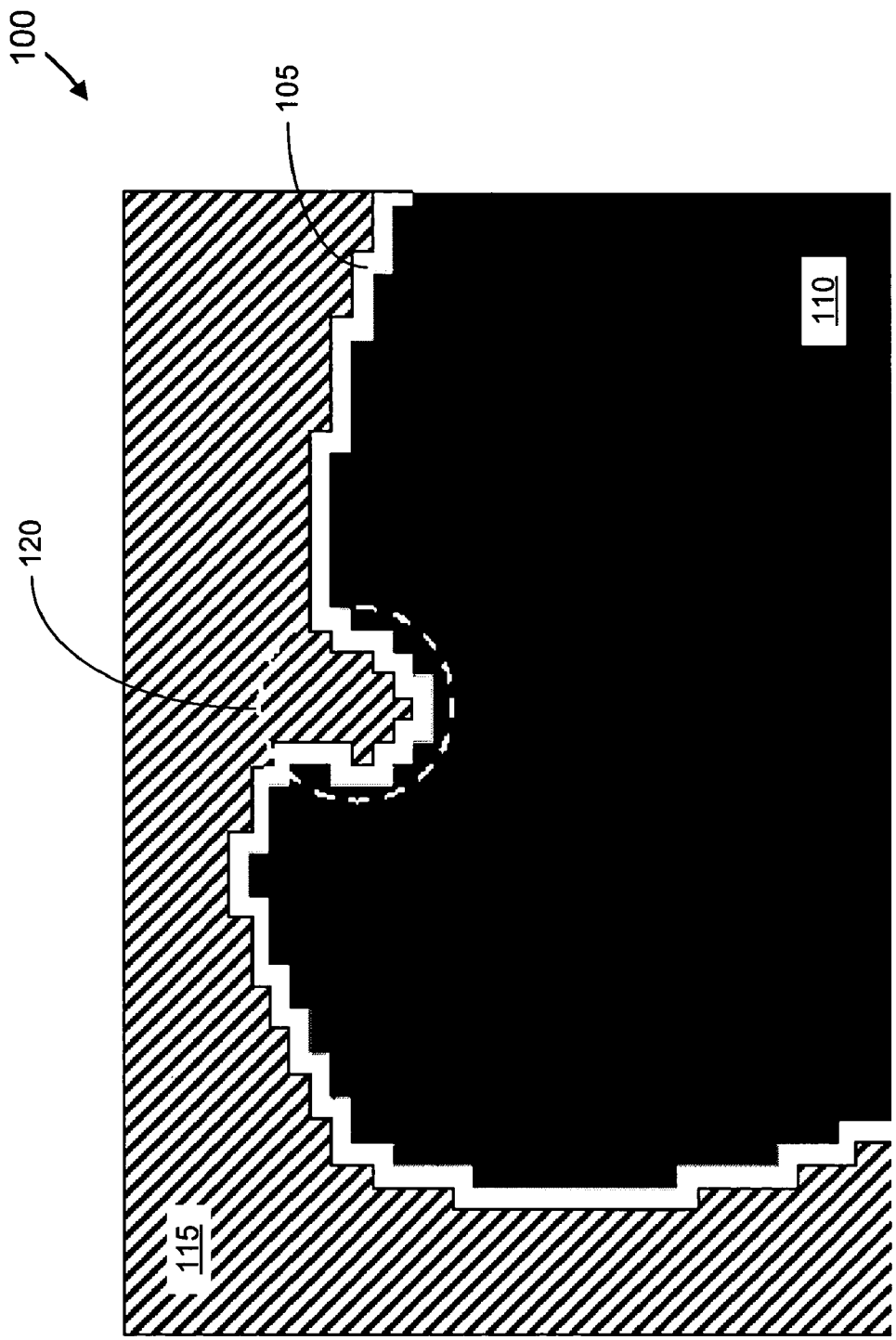
FIG. 1 depicts an exemplary CT image of a portion of a colon.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

We present exemplary methods and systems for selectively considering pixels/voxels as possible seeds for region growing. Rather than attempting a region growing approach from all the boundary locations (i.e., pixels/voxels), a more efficient approach may region grow from only selected locations. In medical applications, for example, the side of images to be processed can be rather large (e.g., on the order of several million pixels/voxels). Thus, careful attention should be taken when considering a pixel as a possible seed for region growing. By careful selection of the seed point, considerable speed-up can be achieved.

Four observations are key for determining seed points:

(1) Any convex region must be enclosed by a border that denotes a transition between an inner portion of the region and the outer portion. The characterization of the border transition (i.e., edge area) may depend on the application and the data modality (e.g., computer tomography, magnetic resonance, ultrasound, etc.).

(2) In the case of strictly convex objects, such as discs or spheres, there always exists at least a point that is a corner point. A corner point is a surface point whose foreground neighbors lie strictly into half a plane/volume.

(3) The corner point is one of many points that can be located on the surface of a convex object using salient features. Using different salient features enables other unique locations favorable for growing a region to be identified. Examples of salient features which allow to determine good seed locations include that of the maximum or minimum Gaussian curvature on the surface, locus of projection of intersection of normals, and the like.

(4) A concave region may also be interpreted as a negative convexity, in which case all the above consideration equally applies.

In the exemplary embodiments discussed here, the salient features will be based on properties of the neighborhood and the location that is selected will be characterized by that which is a corner on the surface.

To better define a corner location, we introduce the notation of connectivity. A location "C" has connectivity equal to two (2) (labeled as N2-connected) if its left and right neighbors are present. The location "C" has connectivity equal to four (4) (labeled as N4-connected) if it is N2-connected with its upper and lower neighbors. Other label notations may be used, as contemplated by those skilled in the art. For example, referring now to FIG. 3, "C" has 8 neighbors a1-a8 at distance 1 from "C." This is an example of a matrix neighborhood; however, other layouts for different topologies may be used, as contemplated by those skilled in the art.

Now, given a neighborhood, with "C" at its center, a corner point is present when half or less of the neighbors that are adjacent to each other and are N4-connected are present. For example, referring again to FIG. 3, there are 8 neighbors with at most 4 neighbors having N4 connectivity (e.g., a1-a4 in clockwise order). The N4 connectivity of the neighbors is a requirement because having a1, a2, a3 and a5 would make C not a corner but a bridge. The terms N4, N6, N8 and N26 refer to the number of neighbors adjacent to the surface point. For example, N4 refers to a center pixel and the respective pixels to the left, the right, the top and the bottom of the center pixel. For another example, N26 refers to every voxel adjacent to a center voxel in a 3×3×3 neighborhood.

Although not so limited, for the sake of simplicity, the term "pixel" will be used in describing exemplary embodiments below. However, it should be appreciated that in alternate embodiments, the embodiments may contain voxels instead of pixels.

Because the goal is efficiently extracting a convex region which contains border pixels/voxels from an image, it follows that a technique that enables growing selectively from the border pixels/voxels will be desired.

Figure 2:
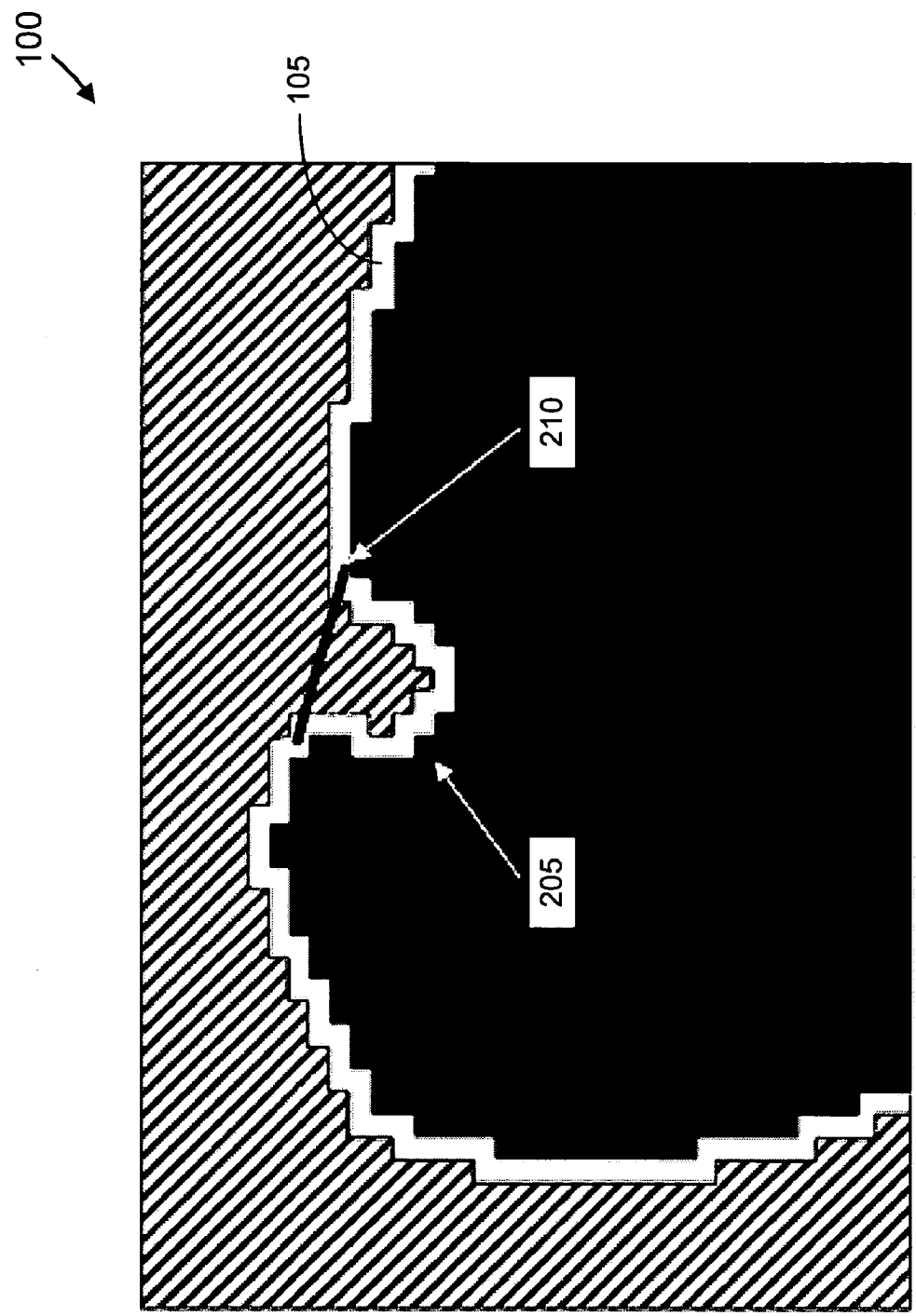
FIG. 2 depicts the exemplary CT image of the portion of the colon of FIG. 1.

In the context of colonic polyps protruding from the colon wall into the lumen (i.e., air), for example, any point on the surface of the colon wall can be considered as a valid seed point when using a region growing technique for detecting shape of a polyp. In particular, as we have observed in FIGS. 1 and 2, the regions (i.e., the convex objects) that we are interested in detecting have a boundary area and protrude. For the pixels/voxels to protrude, the pixels/voxels must curve and expand out, thereby introducing corners. These corners are typically (a) a portion of the boundary and (b) a part of the convex region.

Figure 3:
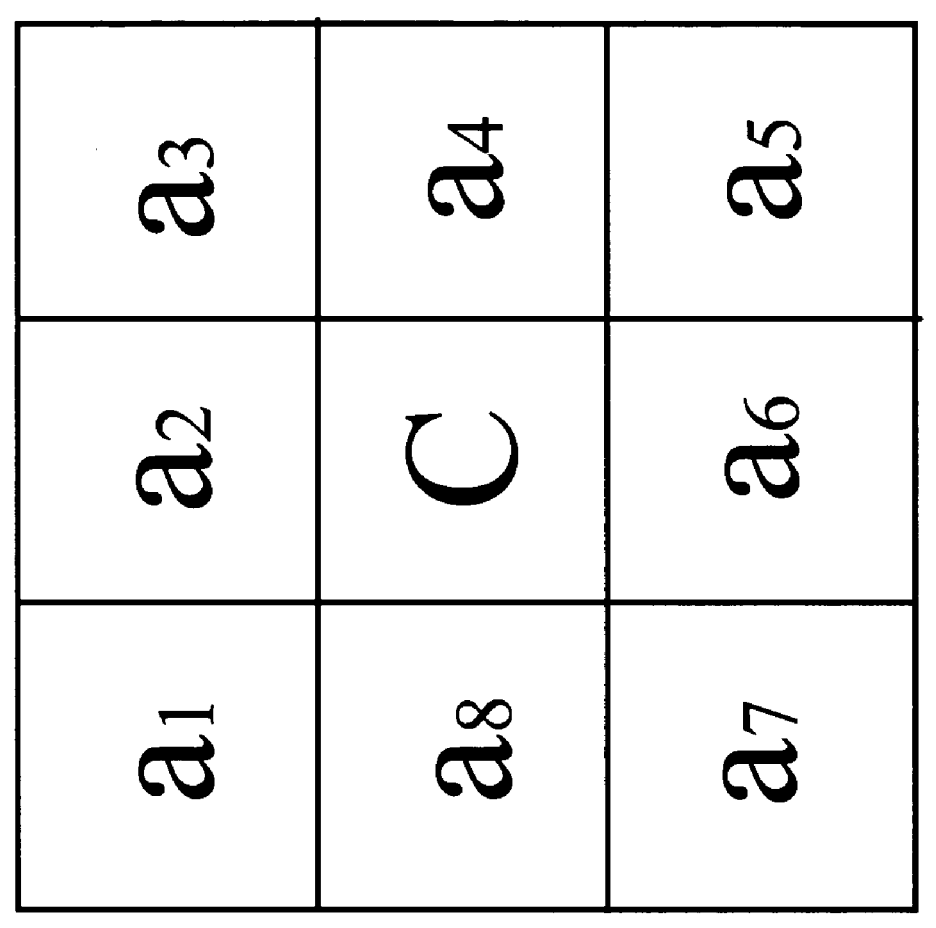
Figure 4:
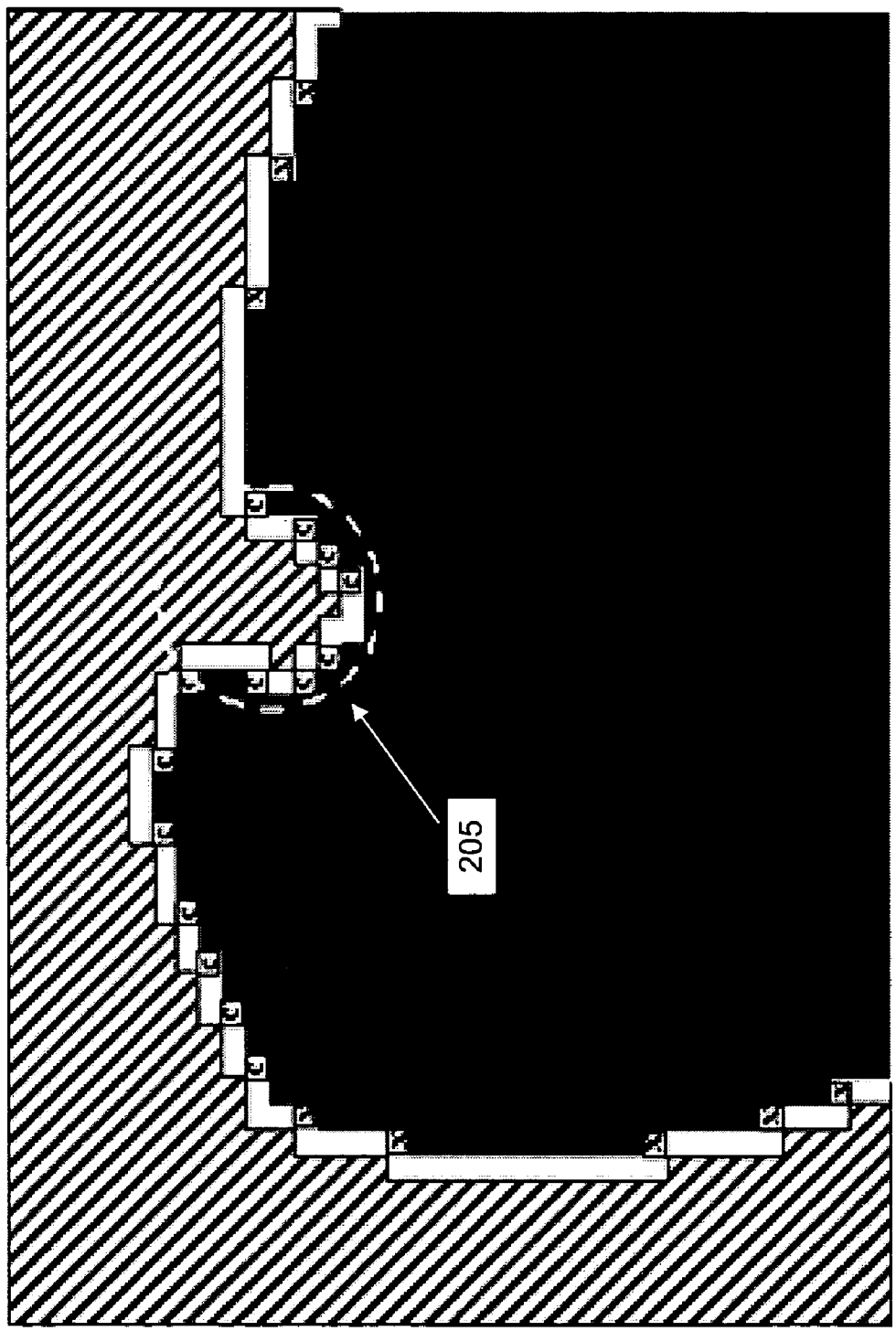
FIG. 4 depicts the convex region 205 of FIG. 2 with labeled corners "c" and "x," in accordance with one exemplary embodiment of the present invention.

Referring now to FIG. 4, the convex region 205 is shown with labeled corners "c" and "x." Because FIG. 4 is a 2D image, both labeled corners "c" and "x are equally good candidates to begin region growing. All the protruding border corners are equally good candidates to grow a region in 2D. However, when considering the adjacent voxels in 3D, many of these candidates labeled by "x" in FIG. 3 are no longer good candidate corners labeled by "c" in FIG. 3, but just voxels on a border.

Figure 5:
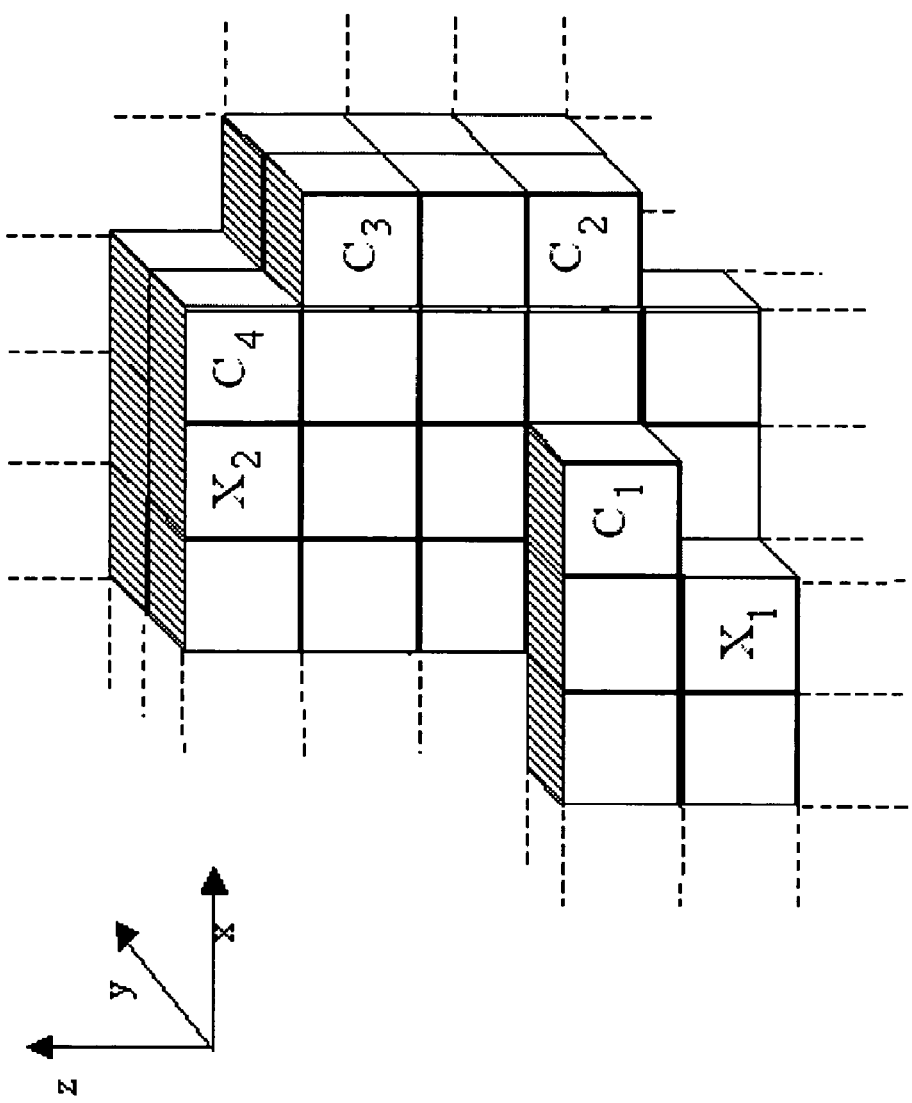
FIG. 5 depicts an image with corner voxels in which 2D corners in the zy-plane are clearly no longer proper corners in 3D, while others corners remain proper corners when in 3D, in accordance with one exemplary embodiment of the present invention.

Referring now to FIG. 5, an exemplary image 500 with corner voxels is illustrated in which 2D corners in the zy-plane (e.g., the plane which includes x2 and c1) are clearly no longer proper corners in 3D, while others corners remain proper corners when in 3D. This is an important consideration because it enables reducing the number of candidates as the dimensions of the object increase (i.e., from pixels (2D) to voxels (3D)). The corner voxels marked by "x" are corners when considering the 2D plane, but only those marked by "c" are also corner in the higher dimension.

Thus, we can see that in FIG. 5, while x2 is a corner in the zy-plane, x2 is not a corner in the zx-plane. Thus a corner in 3D (or higher dimension) can be considered a pixel so that C is a corner in all the planes (or hyper-planes) thru that location. With that characterization, we can see that in FIG. 5, only those corners labeled C are truly corners in 3D. This characterization is important because it further reduces the number of candidates. The planes (or hyper-planes) through that location are not just limited to the orthogonal xy-, zy-, and zx-plane but extend to other possible planes. When considering a 3×3×3 neighborhood for instance, 13 discrete different planes cross this point. In another embodiment of the present invention, the neighborhood may be larger or differently shaped, thereby allowing further discrete characterization of the planes. In another embodiment, these hyper-planes may not be discrete to exactly go thru the center of voxels. In yet another embodiment of the present invention, the intersection may be characterized by a corner in 3D (or higher dimension) determined not by planes or hyper-planes but by lines or line segments.

Figure 6:
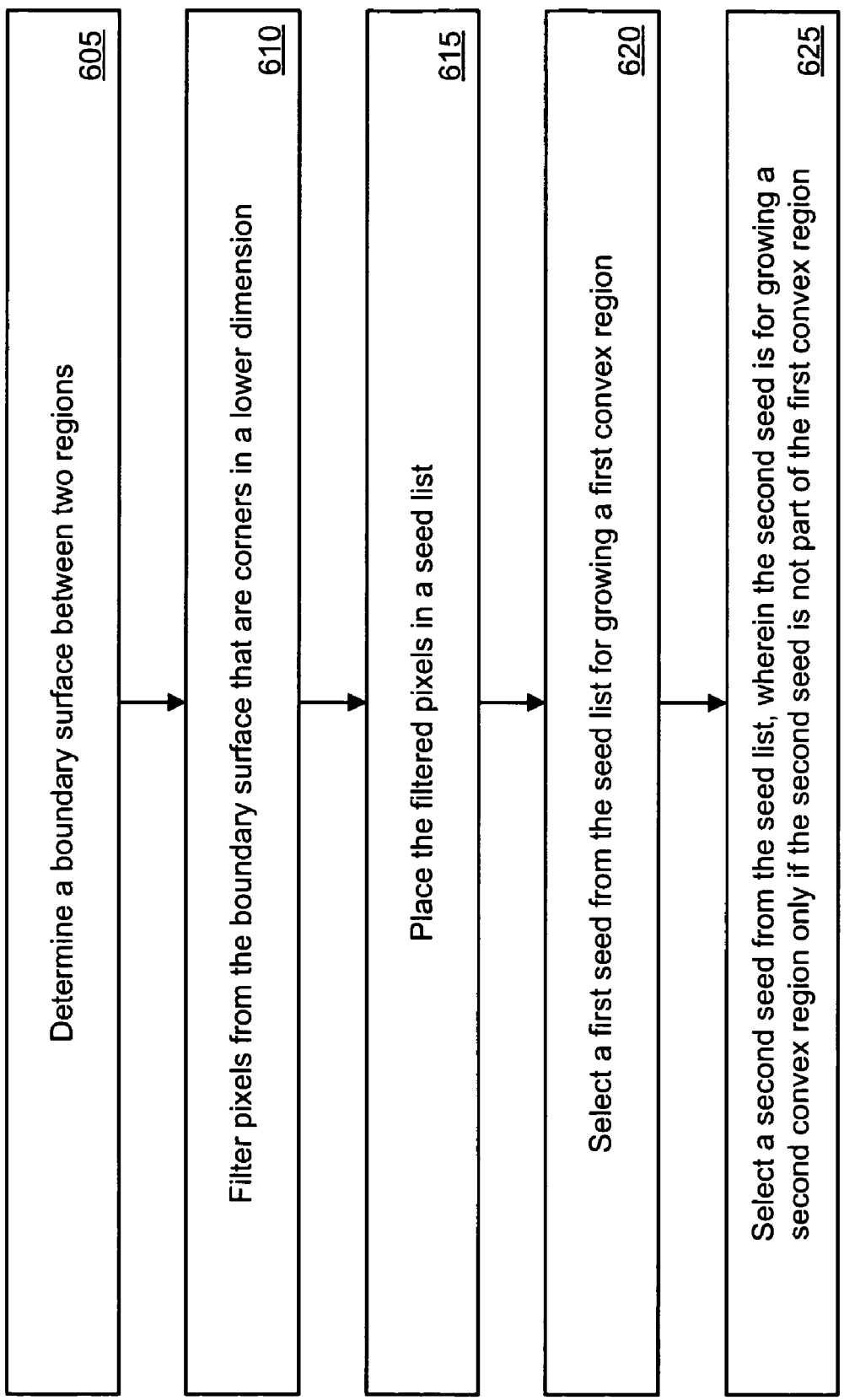
FIG. 6 depicts a method for selecting suitable seed locations in an image for region growing, in accordance with one exemplary embodiment of the present invention.

Referring now to FIG. 6, an exemplary method for selecting suitable seed locations in an image for region growing is shown. A boundary surface is determined (at 605) between two regions. On exemplary embodiment of this approach may implement Canny edged detection, which may vary depending on the nature and the transition characteristics between two regions. Pixels of the boundary surface that are corners in a lower dimension are filtered (at 610). The filtered pixels are placed (at 615) into a seed list. A first seed is selected (at 620) from the seed list for growing a first convex region. A second seed is selected (at 625) from the seed list. A convex region is grown from the second seed only if the second seed is not part of the first convex region.

Referring again to FIG. 4, we show an example of a protruding convex region which includes seeds c2 and c3. In this case, if c2 is selected as the first seed, after processing c1, the convex region extracted would likely include also c3. Thus, after completing the region growth which was started with c2, c3 would be considered as the new seed, observed that it is already part of a convex region, and the region growing process will skip over to c4 and so forth.

An example of a region, convex or concave, grown from the seed location can be the surface of the actual convex region. For instance, referring again to FIG. 2, the region grown from the seed point can be the ribbon area, up to the pixels where line intersects the ribbon. Thus, the convex region can comprise the whole interior region grown from the seed point with the surface itself or simply be characterized by the surface.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for selecting seeds from an image for region determination, comprising:
   determining a boundary between two areas in the image;
   forming a seed list by selecting a plurality of pixels on the boundary that are characterized by a salient local convexity feature that identifies the pixels as seeds for determining a region;
   selecting a first seed from the seed list for determining a first region; and
   selecting a second seed, not part of the first region, from the seed list for determining a second region;
   wherein the salient local convexity feature comprises one of (a) a first order derivative, (b) a second order derivative, and (c) a derivative formulation, and (d) a corner detector.

2. The method of claim 1, wherein the determining of the first and second regions each comprises one of growing, clustering and segmenting.

3. The method of claim 1, wherein determining a boundary between two areas in the image comprises detecting an edge between the two areas.

4. The method of claim 1, wherein the boundary between the two areas is a surface.

5. The method of claim 1, wherein the second region comprises the boundary.

6. The method of claim 5, wherein the boundary comprises a fuzzy transition between the first region and the second region.

7. The method of claim 1, wherein selecting pixels on the boundary surface that are characterized by a salient local convexity feature comprises selecting corners on the boundary surface using the salient local convexity feature.

8. The method of claim 7, wherein selecting corners on the boundary surface using the salient local convexity feature comprises selecting corners that are corners in any plane across the selected pixels.

9. The method of claim 1, wherein determining a first region from the first seed comprises growing a convex region from the first seed.

10. The method of claim 1, wherein determining a first region from the first seed comprises growing a concave region or a hole from the first seed.

11. The method of claim 1, wherein selecting pixels on the boundary that are characterized by a salient local convexity feature comprises selecting at least one pixel for growing a region having a cross-section is approximately circular or elliptical.

12. The method of claim 1, wherein selecting pixels on the boundary surface that are characterized by a salient local convexity feature comprises selecting at least one pixel for growing a region having a cross-section that is approximately cylindrical or paraboloidal.

13. The method of claim 1, wherein selecting pixels on the boundary surface that are characterized by a salient local convexity feature comprises selecting at least one pixel for growing a mostly flat region.

14. The method of claim 1, wherein the boundary between the first region and the second region is broad and fuzzy.

15. The method of claim 14, further comprising determining the salient local convexity feature based on a sub-region of the broad and fuzzy edge.

16. The method of claim 15, wherein selecting pixels on the boundary surface that are characterized by a salient local convexity feature comprises identifying a corner in a sub-region of the broad and fuzzy edge.

17. The method of claim 1, wherein the first region and the second region are either convex or concave regions.

18. A machine-readable medium having instructions stored thereon for execution by a processor to perform a method for selecting seeds from an image for region determination, the method comprising:

determining a boundary between two areas in the image;

forming a seed list by selecting a plurality of pixels on the boundary that are characterized by a salient local convexity feature that identifies the pixels as seeds for determining a region;

selecting a first seed from the seed list for determining a first region; and selecting a second seed, not part of the first region, from the seed list for determining a second region;

wherein the salient local convexity feature comprises one of (a) a first order derivative, (b) a second order derivative, and (c) a derivative formulation, and (d) a corner detector.

19. A method for selecting seeds from an image for region growing, comprising:

determining a boundary surface between two regions in the image;

forming a seed list by filtering pixels of the boundary surface that are corners in a lower dimension characterized by a salient local convexity feature and placing the filtered pixels in the seed list;

selecting a first seed from the seed list for growing a first region; and selecting a second seed not part of first region, from the seed list, for growing a second region;

wherein the salient local convexity feature comprises one of (a) a first order derivative, (b) a second order derivative, and (c) a derivative formulation, and (d) a corner detector.

* * * * *